(12) United States Patent
Breedvelt-Schouten et al.

(10) Patent No.: US 12,242,560 B2
(45) Date of Patent: Mar. 4, 2025

(54) RETRIEVING SAVED CONTENT FOR A WEBSITE

(71) Applicant: KYNDRYL, INC., New York, NY (US)

(72) Inventors: Ilse M. Breedvelt-Schouten, Manotick (CA); John A. Lyons, Ottawa (CA); Jeffrey A. Kusnitz, Campbell, CA (US); Jana H. Jenkins, Raleigh, NC (US)

(73) Assignee: Kyndryl, Inc., New York, NY (US)

( * ) Notice: Subject to any disclaimer, the term of this patent is extended or adjusted under 35 U.S.C. 154(b) by 3 days.

(21) Appl. No.: 17/348,898

(22) Filed: Jun. 16, 2021

(65) Prior Publication Data
US 2022/0405333 A1    Dec. 22, 2022

(51) Int. Cl.
*G06F 17/00* (2019.01)
*G06F 16/9535* (2019.01)
*G06F 16/9538* (2019.01)
*G06F 16/955* (2019.01)
*G06F 16/958* (2019.01)

(52) U.S. Cl.
CPC ........ *G06F 16/958* (2019.01); *G06F 16/9535* (2019.01); *G06F 16/9538* (2019.01); *G06F 16/9566* (2019.01)

(58) Field of Classification Search
CPC .............. G06F 16/958; G06F 16/9566; G06F 16/9535; G06F 16/9538
USPC ................................................ 715/234, 200
See application file for complete search history.

(56) References Cited

U.S. PATENT DOCUMENTS

| | | | |
|---|---|---|---|
| 6,418,433 B1 * | 7/2002 | Chakrabarti | G06F 16/951 707/999.005 |
| 6,608,615 B1 * | 8/2003 | Martins | G06F 16/9577 345/157 |
| 6,712,468 B1 * | 3/2004 | Edwards | G06F 3/013 396/51 |
| 7,383,334 B2 * | 6/2008 | Wong | G06F 16/958 709/224 |
| 7,685,074 B2 * | 3/2010 | Linden | G06Q 30/0603 705/26.7 |
| 8,185,621 B2 * | 5/2012 | Kasha | G06F 16/957 715/236 |
| 8,527,905 B2 * | 9/2013 | Chen | G06F 16/9574 709/219 |
| 8,612,420 B2 * | 12/2013 | Sun | G06F 16/9577 707/802 |
| 8,799,278 B2 * | 8/2014 | Blount | G06F 16/9558 707/804 |
| 9,065,827 B1 * | 6/2015 | Taylor | H04L 67/535 |

(Continued)

FOREIGN PATENT DOCUMENTS

WO    2019193407 A1    10/2019

OTHER PUBLICATIONS

Liu et al., Understanding Web Browsing Behaviors through Weibull Analysis of Dwell Time, Published 2010 via ACM, pp. 1-8 (pdf).*

(Continued)

*Primary Examiner* — Manglesh M Patel
(74) *Attorney, Agent, or Firm* — Erik Swanson; Andrew M. Calderon; Calderon Safran & Wright P.C.

(57) ABSTRACT

Interest of a user in a website is determined. One or more concepts associated with the website are determined. A version of the website is archived.

11 Claims, 4 Drawing Sheets

(56) References Cited

U.S. PATENT DOCUMENTS

| | | | |
|---|---|---|---|
| 9,230,026 B2 | 1/2016 | Blumenfeld | |
| 9,239,881 B2* | 1/2016 | Liu | G06F 16/951 |
| 9,772,979 B1* | 9/2017 | Young | G06F 16/9574 |
| 9,817,804 B2* | 11/2017 | Goldstein | G06F 40/194 |
| 10,491,622 B2* | 11/2019 | Chawla | H04L 63/12 |
| 10,832,306 B2* | 11/2020 | Greenberger | G06Q 30/0629 |
| RE48,681 E* | 8/2021 | Liberman Ben-Ami | H04M 3/5191 |
| 11,206,311 B2* | 12/2021 | Liu | H04N 21/812 |
| 2004/0167876 A1* | 8/2004 | Salerno | G06F 16/951 |
| 2006/0069675 A1* | 3/2006 | Ogilvie | G06F 16/9536 |
| 2007/0022098 A1* | 1/2007 | Malik | G06F 16/9535 |
| 2007/0022135 A1* | 1/2007 | Malik | G06F 16/955 707/999.102 |
| 2007/0124693 A1* | 5/2007 | Dominowska | G06F 16/9535 709/224 |
| 2007/0288589 A1* | 12/2007 | Chen | G06F 16/9574 709/219 |
| 2008/0016087 A1* | 1/2008 | Zhang | G06F 16/951 |
| 2009/0146775 A1* | 6/2009 | Bonnaud | G06F 9/453 345/158 |
| 2012/0010995 A1* | 1/2012 | Skirpa | G06F 16/9577 705/14.49 |
| 2012/0106793 A1* | 5/2012 | Gershenson | G06V 40/20 382/103 |
| 2012/0310914 A1* | 12/2012 | Khan | G06F 16/951 707/E17.083 |
| 2012/0317472 A1* | 12/2012 | Chernysh | G06F 40/131 715/234 |
| 2013/0325463 A1* | 12/2013 | Greenspan | G06F 16/954 704/235 |
| 2014/0168054 A1* | 6/2014 | Yang | G06F 3/013 345/156 |
| 2014/0173417 A1* | 6/2014 | He | G06F 40/123 715/234 |
| 2014/0380142 A1* | 12/2014 | Mikutel | G06F 9/451 715/234 |
| 2015/0135309 A1* | 5/2015 | Karmarkar | G06F 16/532 726/19 |
| 2015/0324350 A1* | 11/2015 | Bufe, III | G06F 40/40 704/9 |
| 2016/0042080 A1 | 2/2016 | Nguyen | |
| 2016/0105482 A1* | 4/2016 | Bradley | G06F 3/0484 715/751 |
| 2016/0140229 A1* | 5/2016 | Kreft | G06F 16/951 707/710 |
| 2016/0261701 A1* | 9/2016 | Dhawan | H04N 19/91 |
| 2016/0267060 A1* | 9/2016 | Skirpa | G06F 3/0481 |
| 2017/0220681 A1* | 8/2017 | Daas | G06F 40/186 |
| 2020/0293581 A1* | 9/2020 | Clauset | G06F 16/951 |
| 2020/0294071 A1* | 9/2020 | Christensen | G06F 16/24578 |
| 2021/0026913 A1* | 1/2021 | Grubb | G06F 16/972 |
| 2021/0049238 A1* | 2/2021 | Vaughn | G06N 20/00 |

OTHER PUBLICATIONS

Davoudi et al., Content-based Dwell Time Prediction Model for News Articles, Published 2019 via Research Gate, pp. 1-8 (pdf).*

Partz Helen, Private Brave Browser Integrates Auto Wayback Machine Lookup, Published Feb. 29, 2020 via cointelegraph.com, pp. 1-7 (pdf).*

Yesaya Tommy Paulus et al., Usability of various dwell times for eye-gaze-based selection with eye tracking, Feb. 2021, Elsevier, pp. 1-9.*

Jeff Sauro, Essential Eye-Tracking Visualizations and Metrics, Dec. 13, 2016, Measuring U, pp. 1-15 (pdf).*

"Internet Archive Wayback Machine", Downloaded from the internet on Mar. 26, 2021, 1 pg., <https://archive.org/web/web.php>.

"Scrible—Modern research and writing platform for school & work", Downloaded from the internet on Mar. 26, 2021, 7 pgs., <https://www.scrible.com/>.

Carlstedt, "Using NLP and context for improved search result in specialized search engines", Jan. 11, 2017, 43 pgs., Malardalen University, School of Innovation Design and Engineering, Västerås, Sweden.

Disclosed Anonymously, et al., "A Method to Generate A Page Summary by Inferring Paragraph Elements of Interest from the Cursor Movement Patterns of Multiple Users", ip.com Prior Art Database Technical Disclosure, IPCOM000261790D, Apr. 3, 2020, 4 pgs.

Haider, "How To Find Lost Or Deleted Web Pages", Ubergizmo. com, Jun. 9, 2015, 16 pgs., <https://www.ubergizmo.com/how-to/find-lost-deleted-pages/>.

Hu, et al., "ScreenTrack: Using a Visual History of a Computer Screen to Retrieve Documents and Web Pages", CHI'20, Apr. 2020, 13 pgs., © 2020 Association for Computing Machinery, Honolulu, HI, USA, <https://doi.org/10.1145/3313831.3376753>.

Wikipedia, "Concept mining", Wikipedia, The Free Encyclopedia, Oct. 2020, 2 pgs., <https://en.wikipedia.org/wiki/Concept_mining>.

Wikipedia, "Natural language processing", Wikipedia, The Free Encyclopedia, Mar. 2021, 12 pgs., <https://en.wikipedia.org/wiki/Natural_language_processing>.

* cited by examiner

RETRIEVING SAVED CONTENT FOR A WEBSITE

BACKGROUND

The present invention relates generally to the field of website, and more particularly to retrieving saved content for a website when it cannot be accessed.

A website consists of one or more web pages that display related or unrelated content. There may be publicly accessible websites that are part of the world wide web. Alternatively, there may be private websites on a private network. Users may access the websites on a wide number of devices, including but not limited to, desktops, laptops, tablets, and smartphones. The devices may use a software application called a web browser to view websites.

SUMMARY

Embodiments of the present invention disclose a computer-implemented method, a computer program product, and a system for website data. In one embodiment, interest of a user in a website is determined. One or more concepts associated with the website are determined. A version of the website is archived.

DETAILED DESCRIPTION

The present invention provides a method, computer program product, and computer system for archiving website data and for providing archived website data. Embodiments of the present invention recognize that a user may utilize information on a web page and at a later time wish to use the same information, however, the web page may no longer exist or has been changed. Embodiments of the present invention recognize that many users may need a way to access web page data that they previously were interested but no longer exists.

Embodiments of the present invention provide for automatically saving web page data based on the determined interest of a user of that web page. Embodiments of the present invention provide for utilizing the saved web page data to be provided to a user when the user makes a real time search request for a certain topic. Embodiments of the present invention provide the advantage of a user not needing to explicitly bookmark a web page in a web browser. Embodiments of the present invention provide the advantage of circumventing ranking changes for search results. Embodiments of the present invention provide the advantage of no manual or mental action needed to rediscover web pages that have been accessed previously that a user cannot access.

Figure 1:
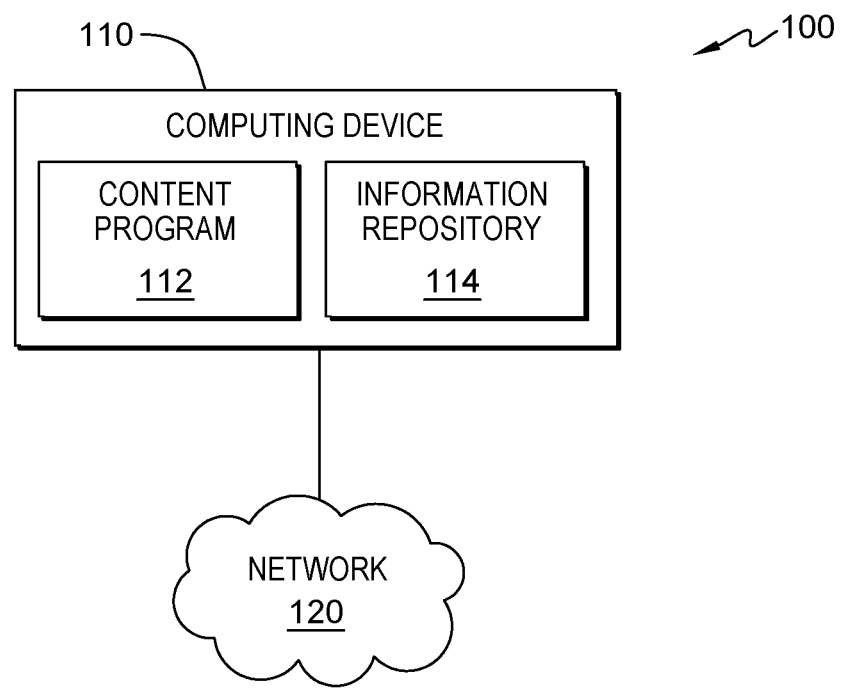
FIG. 1 is a functional block diagram of a network computing environment, generally designated 100, suitable for operation of content program 112, in accordance with at least one embodiment of the invention.

Referring now to various embodiments of the invention in more detail, FIG. 1 is a functional block diagram of a network computing environment, generally designated 100, suitable for operation of content program 112, in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes computing device 110, interconnected over network 120. In embodiments of the present invention, network 120 can be a telecommunications network, a local area network (LAN), a wide area network (WAN), such as the Internet, or a combination of the three, and can include wired, wireless, or fiber optic connections. Network 120 may include one or more wired and/or wireless networks that are capable of receiving and transmitting data, voice, and/or video signals, including multimedia signals that include voice, data, and video formation. In general, network 120 may be any combination of connections and protocols that will support communications between computing device 110 and other computing devices (not shown) within network computing environment 100.

Computing device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 110 represents any programmable electronic devices or combination of programmable electronic devices capable of executing machine readable program instructions and communicating with other computing devices (not shown) within computing environment 100 via a network, such as network 120.

In various embodiments of the invention, computing device 110 may be a computing device that can be a standalone device, a management server, a web server, a media server, a mobile computing device, or any other programmable electronic device or computing system capable of receiving, sending, and processing data. In other embodiments, computing device 110 represents a server computing system utilizing multiple computers as a server system, such as in a cloud computing environment. In an embodiment, computing device 110 represents a computing system utilizing clustered computers and components (e.g., database server computers, application server computers, web servers, and media servers) that act as a single pool of seamless resources when accessed within network computing environment 100.

In an embodiment, computing device 110 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, computing device 110 includes content program 112 and information repository 114. It should be noted, computing device 110 includes a web browser (not shown). A web browser is a software application for accessing websites in private networks and/or the world wide web. A web browser retrieves a web page from a particular website after a request by a user on computing device 110 and the web browser retrieves the necessary content from a web server (not shown) to display on the user interface of computing device 110. Additionally, the web browser may include or be integrated with a search engine. A search engine is a software application that is used to perform web search of the world wide web based on a specified input of a textual web search query. Search results are based upon the textual web search query and the results are generally presented in a line of results. The results may be a mixture of web pagers, images, videos, infographics, etc. A web browser may use a uniform resource locator (URL), also known as a web address, that specifies the location of a web recourse that is used for a web page.

Embodiments of the present invention provide for a content program 112 for archiving website data. In an embodiment, content program 112 receives data. In an embodiment, content program 112 determines user interest in a web page (content). In an embodiment, content program 112 records the data of the web page the user is interested in. In an embodiment, content program 112 determines the concepts in the data. In an embodiment, content program 112 archives the data and the concepts.

Embodiments of the present invention provide for a content program 112 for providing archived website data. In an embodiment, content program 112 receives a search request. In an embodiment, content program 112 determines live data for the search. In an embodiment, content program 112 determines archived data for the search. In an embodiment, content program 112 compares the live data with the archived data. In an embodiment, content program 112 determines whether the live data and archived data are matching. In an embodiment, content program 112 provides the live data and the archived data. In an embodiment, content program 112 provides the live data.

As referred to herein, all data retrieved, collected, and used, is used in an opt-in manner, i.e., the data provider has given permission for the data to be used. For example, the website data received and used by content program 112 to determine concepts and interest in a web page.

In an embodiment, computing device 110 includes information repository 114. In an embodiment, information repository 114 may be managed by content program 112. In an alternative embodiment, information repository 114 may be managed by the operating system of computing device 110, another program (not shown), alone, or together with, content program 112. Information repository 114 is a data repository that can store, gather, and/or analyze information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided information repository 114 is accessible by computing device 110. In an embodiment, information repository 114 may include data, including, but not limited to, interest threshold(s), archived data, determined content of archived data, and the URL of archived data.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Figure 2:
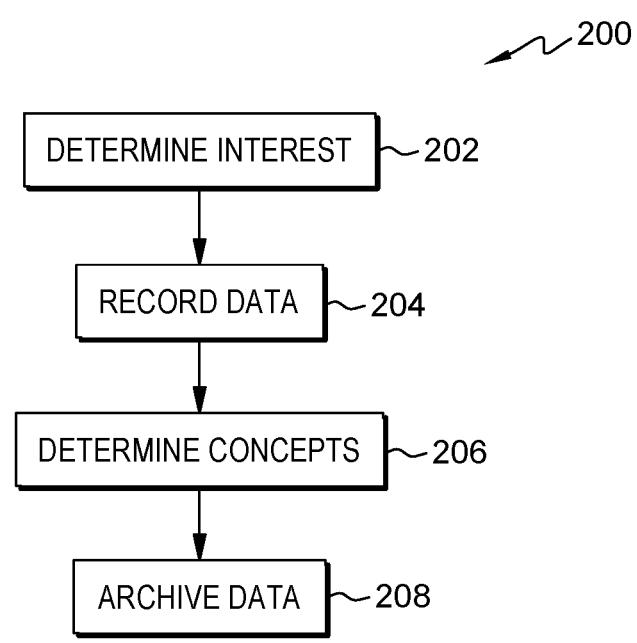
FIG. 2 is a flow chart diagram depicting operational steps for content program 112 for archiving website data, in accordance with at least one embodiment of the invention.

FIG. 2 is a flow chart diagram of workflow 200 depicting operational steps for content program 112 for archiving website data in accordance with at least one embodiment of the invention. In an alternative embodiment, the steps of workflow 200 may be performed by any other program (not shown), such as a web browser, while working with content program 112. It should be appreciated that embodiments of the present invention provide at least for determining optimized locations. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 200 upon a user wanting to archive website data that is determined to be of interest to the user.

Content program 112 determines interest (step 202). At step 202, content program 112 determines interest of a user in a web page. In an embodiment, the user may be viewing one or more web page on the web browser (not shown) of computing device 110. In an embodiment, content program 112 may determine the user is interested in the web page if the user views the web page more than a threshold period of time. In an embodiment, viewing a website includes, but it not limited to, the time a cursor on the user interface is in the user interface of the web page, the time the eye or eyes of the user is looking at the computing device while the web page is visible on the computing device using an imaging device (not shown), the time a user scrolls through a web page, the time a cursor on the user interface is moving in the user interface of the web page, etc. In an embodiment, content program 112 may determine the user is interested in the web page if the user interacts with the web page. In an embodiment, interacting with the web page includes, but is not limited to, clicking a cursor on the user interface of the webpage, copying text or images from the web page, copying the URL of the web page and/or sharing the URL of the web page with another computing device, etc. In an embodiment, content program 112 may determine the user is interested in the web page based on an indication by the user. For example, the user may interact with a user interface graphical element that indicates user interest in the web page.

Content program 112 records data (step 204). At step 204, content program 112 records the data of the web page that the user was determined to have interest in step 202. In an embodiment, content program 112 records the data in information repository 114. In an embodiment, content program 112 may record all data for the web page including all metadata. In an embodiment, the data may include, but is not limited, all text, images, search metadata of a webpage, etc. In an embodiment, search metadata may be anything that may be mined about the web page by a web crawler (not shown) that may be used by a search engine (not shown). For example, this may include MD5 hash keys for the page content, images, etc. In an embodiment, the data may not include advertisement data on the web page. In an embodiment, content program 112 may record the block level (text and images in the webpage), layout level, and overall style (the font family, background color, text alignment, line spacing, etc.) of the website.

Content program 112 determines concepts (step 206). In an embodiment, the content program 112 uses natural language processing to determine the concepts found on the website in the data being recorded in step 204. In an embodiment, content program 112 may perform the natural language processing. In an alternative embodiment, another program (not shown) may perform natural language processing functions and provide the results to content program 112. In an embodiment, content program 112 may determine a single concept of the web page. In an alternative embodiment, content program 112 may determine one or more concepts of the web page. In an embodiment, natural language processing may be performed on all text, images, and video of the web page, including, but not limited to metadata associated with the web page. In an embodiment, natural language processing may be performed on all metadata that may be mined about the web page by a web crawler (not shown) that may be used by a search engine (not shown). In an embodiment, the user may provide an indication of what the concept is for the web page to content program 112. In an embodiment, content program 112 may use keyword spotting within the text of the page to determine concepts. Additionally, the metadata associated with the page could be examined. In an embodiment, concept program 112 applying some semantic analysis tool on the content of the web page.

Content program 112 archives the data (step 208). In an embodiment, content program 112 may save the recorded data, including the determined concepts, in information repository 114. In an alternative embodiment, concept program 112 may save the recorded data, including the determined concepts, in another storage device (not shown), such as cloud based data storage, that is connected to network 120 that allows for a user to access the data from another computing device. In other words, if a user performs actions on multiple computing, the saved data may be accessible from all computing devices.

Figure 3:
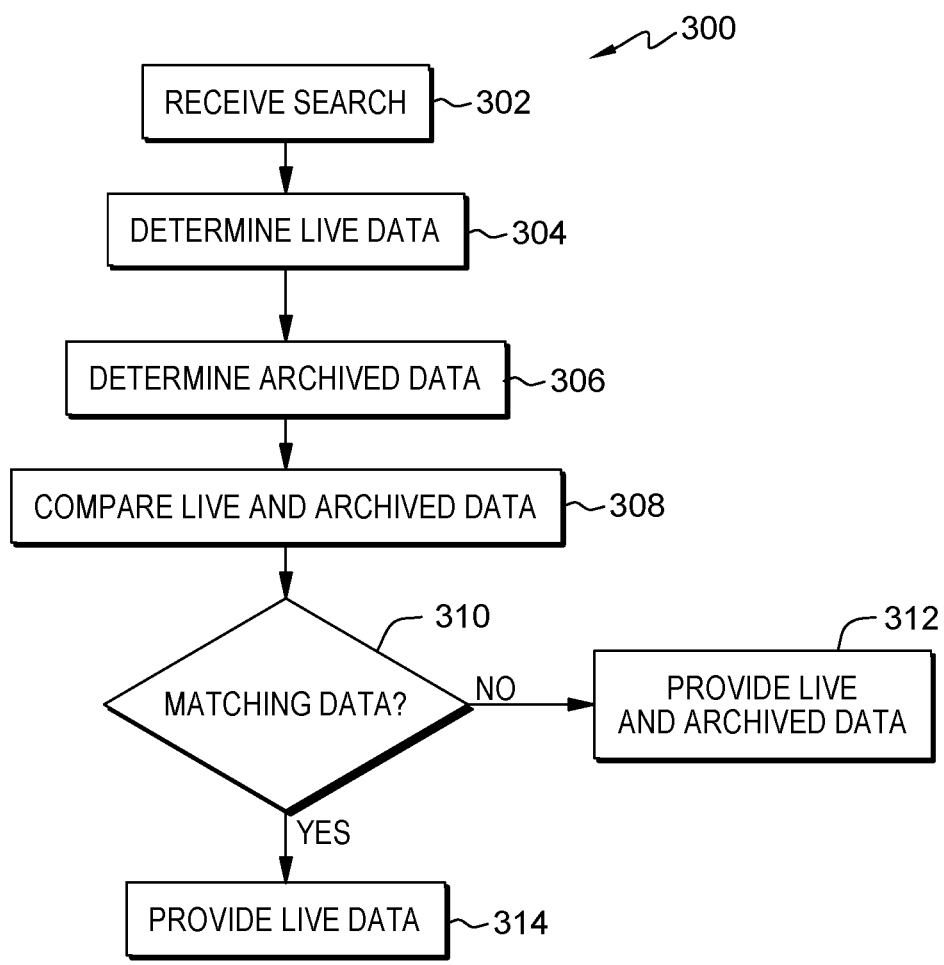
FIG. 3 is a flow chart diagram depicting operational steps for content program 112 for providing archived website data, in accordance with at least one embodiment of the invention.

FIG. 3 is a flow chart diagram of workflow 300 depicting operational steps for content program 112 for providing archived website data in accordance with at least one embodiment of the invention. In an alternative embodiment, the steps of workflow 300 may be performed by any other program (not shown) while working with content program 112. It should be appreciated that embodiments of the present invention provide at least for providing archived website data. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 300 upon a user using a search engine in a web browser. In an embodiment, content program 112 may invoke workflow 300 to file searches of saved web pages on a computing devices.

Content program 112 receives a search (step 302). In an embodiment, content program 122 receives, from a user, one or more search terms. In an embodiment, the one or more search terms may be used by content program 112, search engine (not shown), and/or web browser (not shown) to determine web pages on the world wide web associated with the search terms. In an embodiment, the search engine and/or web browser may receive the search terms and pass the search terms on to content program 112.

Content program 112 determines live data (step 304). In an embodiment, content program 112 may determine live, in other words current or real-time, web page data related to the search of step 302. In an embodiment, content program 112 may perform the search engine function of the world wide web in order to return live data web pages related to the search function. In an alternative embodiment, a search engine (not shown), and/or web browser (not shown) may determine web pages on the world wide web associated with the search terms and provide those results to content program 112.

Content program 112 determines archived data (step 306). At step 306, content program 112 determines whether any previously archived data is related to the received search of step 302. In an embodiment, content program 112 compares search term to the determined concepts of previously archived data. In an embodiment, content program 112 determines archived data as any saved data for a website that has a concept and/or uses the wording within the website of the received search of step 302. In an embodiment, archived data may be saved data that describes the content of the web page with metadata like concepts and topics that are derived from the content of the web page.

Content program 112 compares the live and archived data (step 308). At step 308, content program 112 compares the results of the determined live data of step 304 and the determined archived data of step 306. In an embodiment, content program 112 may compare the URL of the live data to the URL of the archived data. In an embodiment, content program 112 may determine the concepts of the live data and compared the determined live data concepts to the concepts of the archived data. In an embodiment, content program 112 may compare the search metadata of the live data web page and the search metadata of the archived data web page. As noted previously, search metadata includes, but is not limited to, anything that may be mined about the web page by a web crawler (not shown) that may be used by a search engine (not shown)

Content program 112 determines whether any of the data is matching (decision step 310). Based on the comparison done in step 308, content program 112 determines whether any of the data is matching. In an embodiment, the matching may be a comparison of the URL. In other words, does some, all, or a above threshold amount of the of the URL match. In an embodiment, if some of the URL data matches then the data is matching. In an embodiment, if all of the URL data matches then the data is matching. In an embodiment, if more than a threshold amount of the URL data matches then the data is matching. In an embodiment, the matching may be a comparison of key words in the live data and concepts of the archived data. In an embodiment, if one of the key words and concepts is the same then the data is matching. In an embodiment, if more than a threshold number of key words and concept are the same then the data is matching. In an embodiment, if content program 112 determines the data is matching (decision step 310, yes branch), processing proceeds to step 314. In an embodiment, if content program 112 determines the data is not matching (decision step 310, no branch), processing proceeds to step 312.

Content program 112 provides the live and archived data (step 312). At step 312, content program 112 provides the results of the determined live data of step 304 and the determined archived data of step 306. In an embodiment, content program 112 may provide the live data and archived data through the user interface of content program 112. In an alternative embodiment, content program 112 may indicate to a search engine (not shown), and/or web browser (not shown) to provide the live data and the archived data to the user via the user interface. For example, this may be search results from a search topic in a search engine along with the archived data results. In an embodiment, content program 112 may highlight and/or differentiate the live and archived data via a formatting on the user interface. For example, archived data results may be in bold, underline, and/or italics.

Content program 112 provides live data (step 314). At step 314, content program 112 provides the determined live data of step 304 to the user vis the user interface of computing device 110. In an embodiment, content program 112 may provide the live data through the user interface of content program 112. In an alternative embodiment, content program 112 may indicate to a search engine (not shown), and/or web browser (not shown) to provide the live content to the user via the user interface. For example, this may be search results from a search topic in a search engine.

In a simple example, a user is browsing and searching for product documentation. The user finds a web page about the configuration of their product and spends time on the web page reviewing the steps for configuring the product. Because the user spent above a threshold time on the web page, the program saves and archives the data of the web page including key concepts (configuration of product for example). However, when the product is installed, the user forgets about the web page. In the future, the computer breaks, and the user must reinstall the product. The user remembers there were some specific configuration steps on the web page the user had visited previously. When the user searches, using a search engine, for the information regarding configuration of the product on the world wide web, a number of results are returned, however the original web page the user visited no longer exists. Therefore, the program determines if any archived data matches the search of the user, and in this case, returns the archived product configuration web page due to the concepts of the archived data matching the search information the user is searching for.

Figure 4:
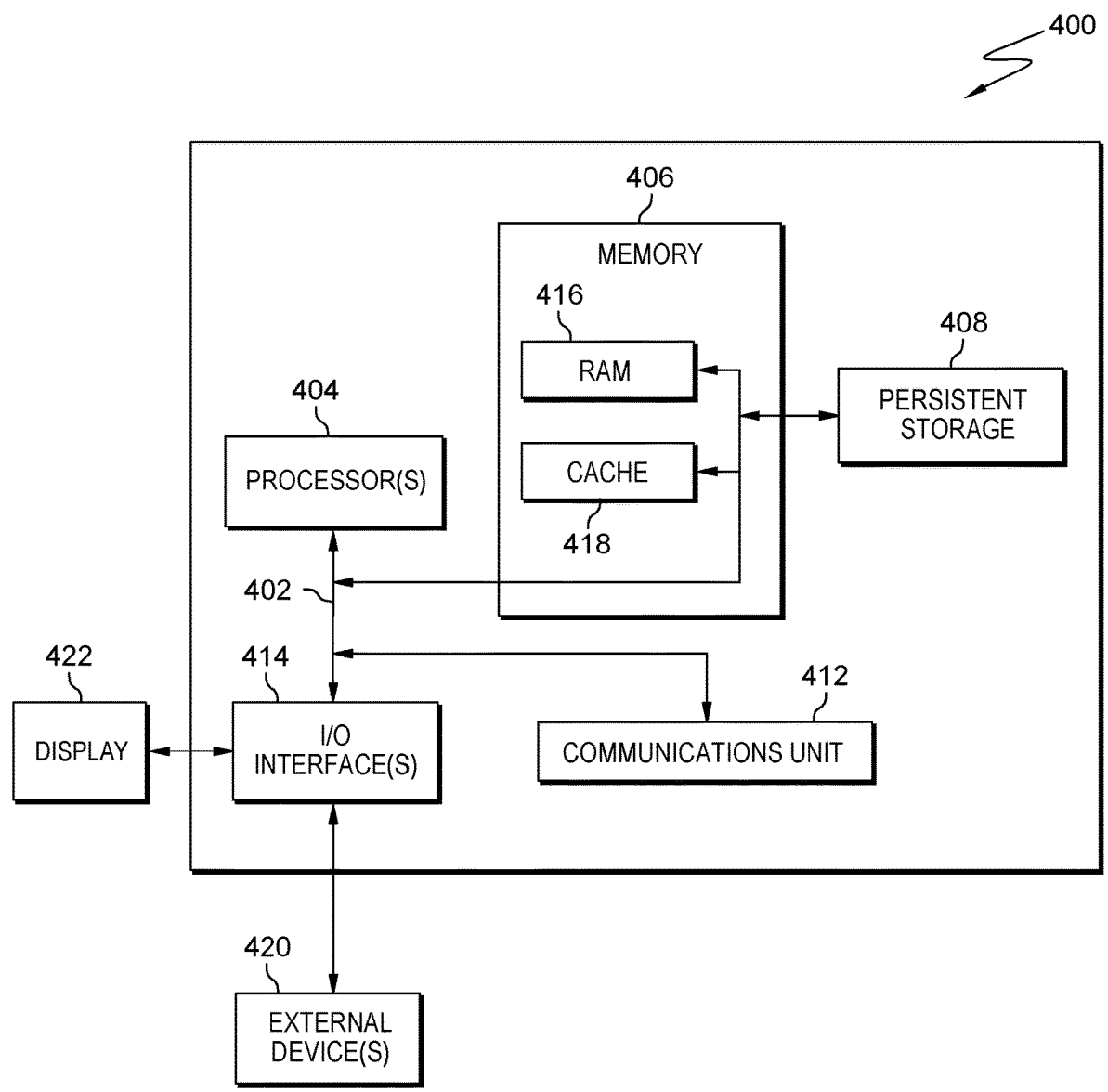
FIG. 4 is a block diagram depicting components of a computer, generally designated 400, suitable for executing central content program 112, in accordance with at least one embodiment of the invention.

FIG. 4 is a block diagram depicting components of a computer 400 suitable for content program 112, in accordance with at least one embodiment of the invention. FIG. 4 displays the computer 400, one or more processor(s) 404 (including one or more computer processors), a communications fabric 402, a memory 406 including, a RAM 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with an architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random-access memory (RAM) 416 and a cache 418. In general, the memory 406 may comprise any suitable volatile or non-volatile one or more computer readable storage media.

Program instructions for content program 112 may be stored in the persistent storage 408, or more generally, any computer readable storage media, for execution by one or more of the respective computer processors 404 via one or more memories of the memory 406. The persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received, and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for website data, said computer-implemented method comprising:
  determining, by one or more computer processors in communication with an imaging device, an interest of a user in a web page of a website, wherein said determining the interest of the user in the web page comprises determining that the user views the web page more than a threshold period of time relating to use of the web page by detecting an amount of time that the user is looking at a computing device while the web page is visible on the computing device using the imaging device;
  determining, by the one or more computer processors, one or more concepts within the web page, wherein the determining one or more concepts comprises performing natural language processing on metadata mined within the web page, wherein the metadata describes live data of the web page;
  automatically archiving, by the one or more computer processors in response to the determined interest of the user in the web page, a version of the website, the automatically archiving comprising saving the version of the website and the determined one or more concepts for future retrieval that is to be used based on the version of the website no longer being in existence for live data searches;
  receiving, by the one or more computer processors, a search request from the user;
  determining, by the one or more computer processors, the live data in response to the search request, wherein the live data is live websites;
  determining, by the one or more computer processors in response to the search request, the version of the website that was archived;
  comparing, by the one or more computer processors, the live data to the version of the website that was archived to determine whether the live data matches the version of the website that was archived; and
  responsive to the live data not matching the version of the website that was archived, providing, by the one or more computer processors, the live data and the version of the website that was archived to the user.

2. The computer-implemented method of claim 1, wherein said determining the one or more concepts within the web page comprises performing natural language processing on metadata mined within the web page by a web crawler used by a search engine.

3. The computer-implemented method of claim 1, wherein the threshold period of time is selected from the group consisting of an amount of time that an eye of the user is looking at a computing device while the web page is visible on the computing device, an amount of time that the user scrolls through the web page, an amount of time that a cursor on one user interface is moving in another user interface of the web page, and combinations thereof.

4. The computer-implemented method of claim 1, wherein said archiving comprises archiving the version of the website to cloud based data storage.

5. The computer-implemented method of claim 1, wherein the automatically archiving includes archiving the one or more concepts within the web page.

6. A computer program product for website data, the computer program product comprising:
  one or more computer readable storage media; and
  program instructions stored on the one or more computer readable storage media, said program instructions comprising:
    program instructions to determine an interest of a user in a web page of a website, wherein said determining the interest of the user in the web page comprises determining that the user views the web page more than a threshold period of time relating to use of the web page by detecting an amount of time that the user is looking at a computing device while the web page is visible on the computing device using an imaging device;
    program instructions to determine one or more concepts within the web page, wherein the determining one or more concepts comprises performing natural language processing on metadata mined within the web page, wherein the metadata describes live data of the web page;
    program instructions to automatically archive, in response to the determined interest of the user in the web page, a version of the website, the automatically archiving comprising saving the version of the website and the determined one or more concepts for future retrieval that is to be used based on the version of the website no longer being in existence for live data searches;
    program instructions to receive a search request from the user;
    program instructions to determine the live data in response to the search request, wherein the live data is live websites;
    program instructions to determine in response to the search request, the version of the website that was archived;
    program instructions to compare the live data to the version of the website that was archived to determine whether the live data matches the version of the website that was archived; and
    program instructions to, responsive to the live data not matching the version of the website that was archived, provide the live data and the version of the website that was archived to the user.

7. The computer program product of claim 6, wherein said determining the one or more concepts within the web page comprises performing natural language processing on metadata mined within the web page by a web crawler used by a search engine.

8. The computer program product of claim 6, wherein the threshold period of time is selected from the group consisting of an amount of time that an eye of the user is looking at a computing device while the web page is visible on the computing device, an amount of time that the user scrolls through the web page, an amount of time that a cursor on one user interface is moving in another user interface of the web page, and combinations thereof.

9. The computer program product of claim 6, wherein said archiving comprises archiving the version of the website to cloud based data storage.

10. A computer system for website data, the computer system comprising:
  one or more computer processors;
  one or more computer readable storage media; and
  program instructions, stored on the one or more computer readable storage media for execution by at least one of the one or more computer processors, said program instructions comprising:

program instructions to determine an interest of a user in a web page of a website, wherein said determining the interest of the user in the web page comprises determining that the user views the web page more than a threshold period of time relating to use of the web page by detecting an amount of time that the user is looking at a computing device while the web page is visible on the computing device using an imaging device;

program instructions to determine one or more concepts within the web page, wherein the determining one or more concepts comprises performing natural language processing on metadata mined within the web page, wherein the metadata describes live data of the web page; and program instructions to automatically archive, in response to the determined interest of the user in the web page, a version of the website, the automatically archiving comprising saving the version of the website and the determined one or more concepts for future retrieval that is to be used based on the version of the website no longer being in existence for live data searches;

program instructions to receive a search request from the user;

program instructions to determine the live data in response to the search request, wherein the live data is live websites;

program instructions to determine in response to the search request, the version of the website that was archived;

program instructions to compare the live data to the version of the website that was archived to determine whether the live data matches the version of the website that was archived; and program instructions to, responsive to the live data not matching the version of the website that was archived, provide the live data and the version of the website that was archived to the user.

11. The computer system of claim 10, wherein the threshold period of time is selected from the group consisting of an amount of time that an eye of the user is looking at a computing device while the web page is visible on the computing device, an amount of time that the user scrolls through the web page, an amount of time that a cursor on one user interface is moving in another user interface of the web page, and combinations thereof.

* * * * *